US011516253B1

(12) United States Patent
Van Deman, V et al.

(10) Patent No.: US 11,516,253 B1
(45) Date of Patent: Nov. 29, 2022

(54) IDENTITY-AWARE FILTERING PROXY FOR VIRTUAL NETWORKS

(71) Applicant: Amazon Technologies, Inc., Seattle, WA (US)

(72) Inventors: Frank Leslie Van Deman, V, Virginia Beach, VA (US); Joshua Stephen Du Lac, Plano, TX (US); Rebecca Claire Weiss, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 480 days.

(21) Appl. No.: 16/368,490

(22) Filed: Mar. 28, 2019

(51) Int. Cl.
*H04L 9/40* (2022.01)
*H04L 69/326* (2022.01)
*H04L 12/46* (2006.01)
*G06F 9/54* (2006.01)
*H04L 9/32* (2006.01)
*H04L 61/4511* (2022.01)
*H04L 67/56* (2022.01)

(52) U.S. Cl.
CPC ............ *H04L 63/20* (2013.01); *G06F 9/547* (2013.01); *H04L 9/3263* (2013.01); *H04L 12/4641* (2013.01); *H04L 61/4511* (2022.05); *H04L 63/0281* (2013.01); *H04L 63/10* (2013.01); *H04L 63/166* (2013.01); *H04L 67/56* (2022.05); *H04L 69/326* (2013.01)

(58) Field of Classification Search
None
See application file for complete search history.

(56) References Cited

U.S. PATENT DOCUMENTS

| 8,279,864 B2 * | 10/2012 | Wood | H04L 63/0428 370/389 |
| 8,635,450 B2 * | 1/2014 | Elgebaly | H04L 67/322 713/160 |
| 8,763,108 B2 * | 6/2014 | Babbar | H04L 47/10 726/13 |
| 9,038,151 B1 * | 5/2015 | Chua | H04L 45/28 726/6 |
| 9,577,926 B2 * | 2/2017 | Cohn | H04L 63/0236 |
| 9,602,482 B1 * | 3/2017 | Roth | H04L 63/0807 |

(Continued)

OTHER PUBLICATIONS

Jeff Barr; New—TLS Termination for Network Load Balancers; Jan. 2019; retrieved from the Internet https://aws.amazon.com/blogs/aws/new-tls-termination-for-network-load-balancers/; pp. 1-6, as printed. (Year: 2019).*

*Primary Examiner* — Michael W Chao
(74) *Attorney, Agent, or Firm* — Eversheds Sutherland (US) LLP

(57) ABSTRACT

Devices and methods are provided for using an identity-aware proxy to filter transmissions for virtual networks. The device may receive an encrypted application programming interface (API) call from a second device, wherein the encrypted API call is associated with a remote network resource, and wherein the device is included in a remote network which includes the remote network resource. The device may determine, based on the encrypted API call, an account associated with the remote network resource. The device may determine that the account is not authorized to access the remote network resource using the remote network. The device may send an error notification to the second device.

20 Claims, 6 Drawing Sheets

(56) References Cited

U.S. PATENT DOCUMENTS

| | | | |
|---|---|---|---|
| 9,967,366 B2* | 5/2018 | Hao | H04L 67/32 |
| 10,003,466 B1* | 6/2018 | Miller | H04L 9/3247 |
| 10,313,397 B2* | 6/2019 | Komu | H04L 63/0218 |
| 10,419,401 B2* | 9/2019 | Baig | H04L 63/0428 |
| 10,868,833 B2* | 12/2020 | Belamaric | H04L 63/105 |
| 11,044,083 B2* | 6/2021 | Pahl | H04L 9/3268 |
| 11,128,438 B1* | 9/2021 | Konda | H04L 63/20 |
| 11,140,124 B2* | 10/2021 | Reddy | H04L 63/0428 |
| 11,176,459 B2* | 11/2021 | Frayman | G06N 20/20 |
| 11,190,487 B2* | 11/2021 | Xu | H04L 63/0428 |
| 11,310,053 B2* | 4/2022 | Bracken | H04L 63/166 |
| 11,329,958 B2* | 5/2022 | Tarnavsky | H04L 63/0478 |
| 11,336,693 B2* | 5/2022 | Penner | H04L 63/105 |
| 2008/0126794 A1* | 5/2008 | Wang | H04L 63/0823 |
| | | | 713/151 |
| 2012/0216271 A1* | 8/2012 | Cooper | H04L 63/029 |
| | | | 726/12 |
| 2013/0198509 A1* | 8/2013 | Buruganahalli | G06F 21/606 |
| | | | 713/151 |
| 2015/0043350 A1* | 2/2015 | Basilier | H04L 47/24 |
| | | | 370/235 |
| 2015/0067809 A1* | 3/2015 | Madani | H04L 63/0815 |
| | | | 726/8 |
| 2015/0200955 A1* | 7/2015 | Martin | H04L 63/168 |
| | | | 726/23 |
| 2016/0266922 A1* | 9/2016 | Brandwine | G06F 21/62 |
| 2016/0359823 A1* | 12/2016 | Ayyadevara | H04L 63/061 |
| 2017/0272470 A1* | 9/2017 | Gundamaraju | H04W 4/24 |
| 2017/0289197 A1* | 10/2017 | Mandyam | H04L 63/06 |
| 2017/0353437 A1* | 12/2017 | Ayyadevara | H04L 9/3213 |
| 2019/0182235 A1* | 6/2019 | Raman | H04L 63/0428 |
| 2019/0327224 A1* | 10/2019 | Zhang | H04L 63/0823 |
| 2021/0250330 A1* | 8/2021 | Gurney | H04L 63/101 |
| 2022/0078165 A1* | 3/2022 | Ludin | H04L 63/0807 |

* cited by examiner

IDENTITY-AWARE FILTERING PROXY FOR VIRTUAL NETWORKS

BACKGROUND

Devices may access services hosted by a remote network by using virtual networks dedicated to an account with the remote network. When devices use an account to call computer resources for the services on the remote network, the virtual network may not be able to determine whether the account is authorized to access the resources from the remote network using the virtual network. The virtual network may be limited to identifying that traffic associated with the call to the computer resources is destined somewhere within the remote network, and may require compromising encryption security to inspect whether the call to the computer resources was made by a user with an account authorized to operate using the virtual network.

Figure 1:
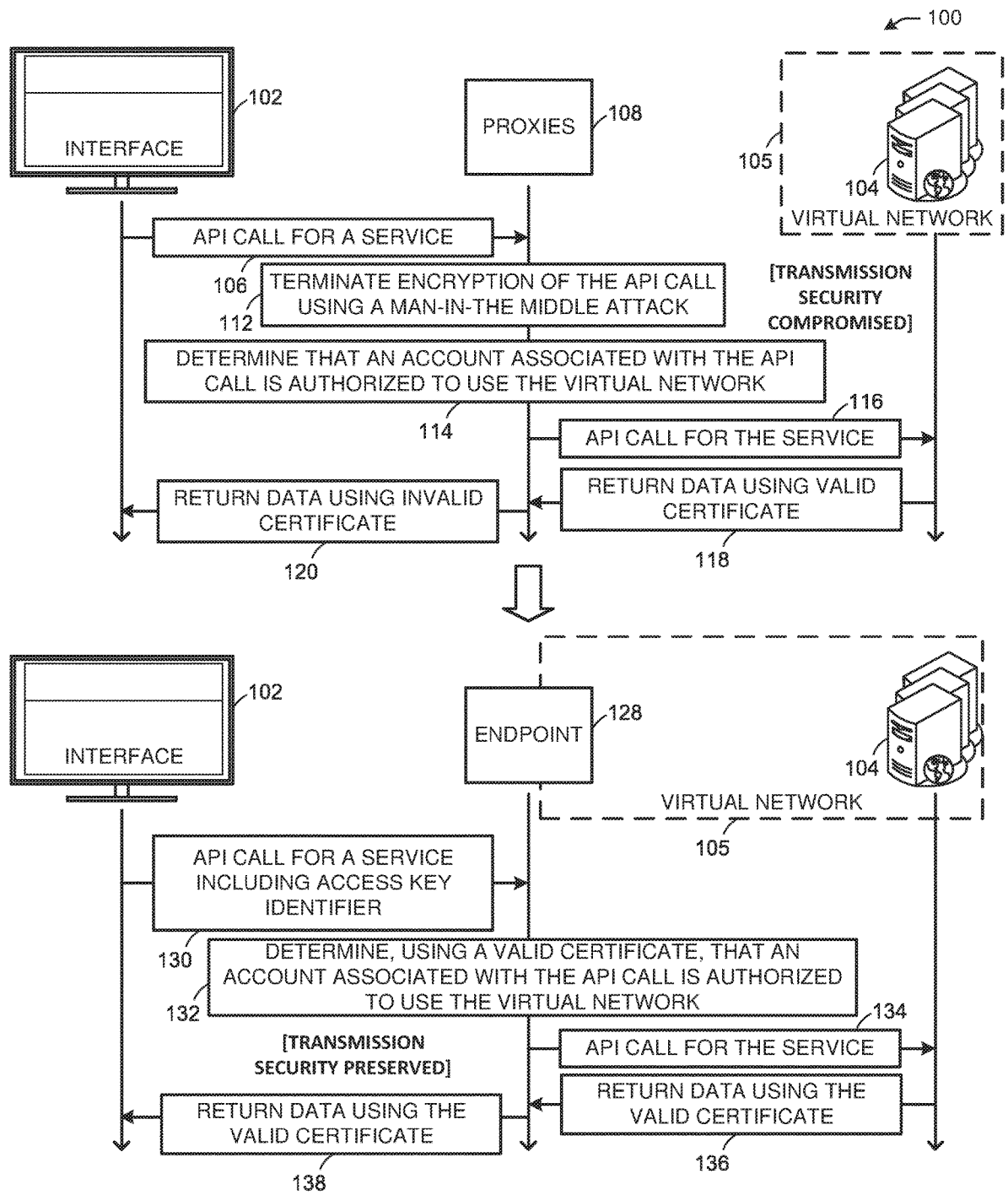
FIG. 1 illustrates an example process for identity-aware filtering with a proxy for virtual networks, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for implementing an identity-aware filtering proxy for virtual networks.

Devices may access remotely stored and managed computer resources for computer-based services (e.g., remote network resources). To facilitate access to remote networks which host the computer-based resources, a virtual network may use one or more networking layers to create a virtual network dedicated to one or more accounts for the remote network. The remote network may host multiple virtual networks dedicated to different accounts. A virtual network may be isolated logically from other virtual networks within the remote network, and may allow devices connected to the virtual network to access and launch computer-based resources such as databases, elastic computing resources, queue service resources, notification service resources, elastic container resources, serverless computing resources, and other types of computer resources hosted by a remote network. A virtual network may be limited to a range of Internet protocol (IP) addresses, subnetworks, and security groups, and users may configure routing tables for the virtual network.

Devices using the virtual network may make application programming interface (API) calls to access the computer resources on the remote network. An API may be provided by a server for a computer resource on the remote network, and the devices may use the API to access the computer resources. For example, a device may view and edit data for a computer resource through an API. In a hypertext transfer protocol (HTTP) request, an API call may include a uniform resource locator (URL), an indication of a type of action for the server to perform (e.g., get data, post data, put data, delete data, etc.), a header, and a data payload with data that the device intends to send to the server.

When a device uses a virtual network to make API calls to a remote network resource, the virtual network may govern whether an account or tenant used to make the API calls is permitted to access remote network resources. For example, an employer may authorize the virtual network to allow employees to make API calls to remote network resources using an employer account for the employer's virtual network. However, an employee may have a separate personal account for computer resources hosted by the remote network, and the employer may not authorize the employee to make API calls to the employee's remote network resources from the employer's virtual network.

API calls using a virtual network may use security protocols such as encryption protocols. One such encryption protocol is transport layer security (TLS), which facilitates secure connections between a device and a server by using an agreed key (e.g., based on a TLS handshake procedure in which the device and server negotiate keys before transmitting data). Encrypted transmissions between devices and servers may include an access key identifier, which may be assigned using a canonical request (e.g., creating a string including information in a request). A remote network may authorize the account or tenant based on the access key identifier of an API call. For example, the remote network may identify a user from the access key identifier, and may map the user to an account (e.g., associated with an organization) to which the user belongs and which may have access to the remote network. The TLS encryption may be established with a remote network with which a device access remote network resources. A device, such as a device operated by an organization with access to the remote network using a virtual network dedicated to the organization, may become a "man-in-the-middle" device by terminating a TLS connection to inspect a TLS-encrypted transmission. Because the man-in-the-middle device effectively pretends to be a valid endpoint, the man-in-the-middle device may use a privately issued (e.g., invalid) certificate rather than an authentic/valid remote network encryption certificate of the remote network to determine whether the organization's dedicated virtual network allows a user making an API call to operate using the organizations dedicated virtual network. The man-in-the-middle device cannot be a valid endpoint for the encrypted API call and cannot use a valid certificate because the man-in-the-middle device does not have possession of the private key, which instead is held by the valid remote network API endpoint. After terminating the TLS encryption (e.g., "cracking"), the man-in-the-middle device may reform the TLS encryption of the transmission to be sent to the remote network. Because a man-in-the-middle device not part of the remote network cannot use the valid certificate without the associated private key, such a device may need to undermine the encryption of an encrypted transmission using an invalid certificate (e.g., not a certificate associated with the remote network as the endpoint of the transmission) and before the encrypted transmission reaches the remote network as an endpoint to determine whether to allow the transmission. Such is a real violation of the security of an encrypted transmission, as a client expects to send an end-to-end encrypted communication with full privacy and confidence in the identity of the third party. When a man-in-the-middle device terminates the encryption of an encrypted transmission, the privacy of the transmission is violated and the client device which sent the encrypted transmission cannot verify the identity of the man-in-the-middle device (e.g., the invalid certificate).

To determine whether an API call is for the account or tenant authorized or not authorized by the virtual network to use the virtual network, a virtual network may use a proxy to receive and inspect the API call. However, such an inspection may require terminating or "cracking" the TLS protocol (e.g., undermining the encryption of the API call). One way of cracking TLS is for a virtual network to use its own private certificates in place of valid certificates (e.g., which a proxy device does not possess, as the device does not have the associated private key), so the use of network-specific certificates may not provide the confidentiality (e.g., via end-to-end encryption) and authentication that TLS and other encryption methods may provide. The use of proxies to crack the TLS of API calls to remote network resources may be akin to performing a "man-in-the-middle attack" on the virtual network, undermining the security of the API calls made to the remote network from the virtual network.

Virtual networks may use endpoints such as gateways and interfaces. An interface may refer to a connection to a local segment (e.g., a port). A gateway may refer to a path to a remote network (e.g., a router). However, virtual network endpoints may connect to a single remote network service, thereby requiring many endpoints to connect multiple devices to multiple services hosted by a remote network. For example, if a remote network fails to provide identity-aware filtering for all services available using the remote network, a remote network customer may need to implement man-in-the-middle devices to monitor traffic for the remote network services which lack identity-aware filtering. The use of multiple virtual networks for a remote network customer may require many man-in-the-middle devices. To monitor a large number of endpoints by cracking TLS of transmissions, the hardware and software cost of proxy solutions may be prohibitive, and the proxy solutions may be unreliable at high volumes.

Therefore, the security of virtual networks may be improved by using identity-aware filtering proxies which monitor and control the transmission of API calls to remote network services without compromising encryption and without requiring a respective endpoint for each remote network service which may be accessed using the virtual network.

In one or more embodiments, a proxy (e.g., a device, system, server, etc.) may be established within a virtual network (e.g., at an edge of a virtual network) which allows devices to access remote network resources using respective APIs of the remote network resources. A network address translation (NAT) method in which an address is mapped from one address space (e.g., IP) to another by including information in transmitted packets. A NAT device is one type of an edge network device. An identity-aware filtering proxy may serve as a valid TLS termination point which maintains encryption integrity and confidentiality of a transmission rather than serving as a man-in-the-middle TLS cracking point. In particular, rather than cracking the TLS of a transmission from a device using the virtual network to call a remote network resource, the proxy may function as the outbound endpoint for the domain name system (DNS) zones of a virtual network. The proxy may generate remote network endpoint-specific hostnames for a virtual network, and may map the virtual network DNS zone for any service hosted by a remote network to the endpoint of the proxy. In this manner, a single virtual network endpoint may facilitate connections between devices using the virtual network and any (e.g., multiple) services hosted by the remote network. For example, the identity-aware filtering proxy may have valid certificates issued by a valid and trusted public certificate authority and which may match the hostnames of the endpoints, whereas a man-in-the-middle device may assume the hostnames, but cannot obtain the valid certificates and therefore may rely on invalid private certificates issued by a private authority.

In one or more embodiments, the proxy (e.g., an endpoint for the encrypted API call) may evaluate transmissions such as API calls made by devices using a virtual network to access resources of remote network services. The proxy's evaluation may avoid cracking the TLS encryption because, for example, the proxy may be associated with the remote network services rather than being operated by a customer of the remote network services. When the API calls for the remote network resources are authenticated and authorized by a signature process which forms a signature using an access key identifier and secret access key, the proxy may examine received API calls and identify the access key identifier (e.g., within a header of an API call). If the API call is not signed (e.g., due to the public nature of the call or in a failure or degraded scenario), the proxy may evaluate the data payload of an API call to determine the associated user account of the API call. The proxy may find a matching account number and/or organization identifier for a given access key identifier. If the proxy does not find a matching account number, the proxy may discard the API call and prevent the API call from reaching the remote network resource. When the proxy identifies an access key identifier in an API call, the proxy may compare the access key identifier to one or more policies associated with a remote network resource. The proxy may query the remote network of an organization for a respective policy (e.g., which may specify user accounts, tenants, and/or organizations authorized to operate from the virtual network), and may store the policy so that the proxy may evaluate API calls without always having to query the remote network (e.g., caching for improved availability of the policy). Queries and policies may be authored by a customer (e.g., an organization), and may be part of the trusted environment (e.g., which does not terminate the encryption of a transmission before reaching the expected endpoint). The proxy may receive updates to the policy based on user requests, may receive an updated policy from a respective virtual network, and/or may modify an existing policy based on a number of times an API has been called, a number of times unauthorized user accounts have called the API, historical trends in use of the virtual network, and machine learning techniques (e.g., by analyzing contextual or other risk-based factors) which may result in automatic modification of a policy without direct user requests.

In one or more embodiments, a remote network including the proxy may negotiate a private key to use in combination with an access key identifier to sign a request inside an encrypted API call. Encrypted API calls may remain encrypted without the use of any additional identifiers or certificates provided by a device outside of the virtual network (e.g., without replacing an API's server certificate). Therefore, the end-to-end encryption of an API call (e.g., which may encapsulate an HTTP API request) may be maintained until the encrypted API call is safely received by the virtual network 216 (e.g., the end-to-end integrity of the encryption and verification of the end destination is maintained) rather than a middle man proxy breaking or cracking the encryption of the encrypted API call before determining whether to allow an API call to be directed to the virtual network.

In one or more embodiments, the proxy may use lists indicating whether accounts are authorized to operate from the virtual network. A policy may be specific to a particular remote network service. The proxy may determine that an access key identifier corresponds to the account or tenant, and may determine if the account is authorized by a policy to operate from the virtual network. When the account or tenant is authorized to operate using the virtual network, the proxy may send the API call to the respective remote network resource, may receive data in response, and may provide the data to the requesting device. When the account or tenant is not authorized to operate using the virtual network (e.g., is listed as an unauthorized account or is not listed as an authorized account), the proxy may prevent the API call from being sent to the respective remote network resource, may send an error to the requesting device, and/or may report the denial to the virtual network and/or another device.

In one or more embodiments, the proxy may serve as an outbound proxy for traffic destined outside of a remote network (e.g., Internet traffic not associated with using a computer resource hosted by the remote network). A virtual network user may select whether to allow a proxy to filter API calls or other traffic between a virtual network and a resource outside of a remote network.

In one or more embodiments, the proxy may prevent unwanted data exfiltration between resources hosted by a remote network (e.g., a "me, not me" problem). For example, the proxy may prevent the account or tenant with access to resources of a remote network from accessing the remote network resources (e.g., resources using the same remote network) of another account using the virtual network. Such may prevent a user with a personal account from using the personal account to upload company data to the personal account, for example.

In one or more embodiments, the proxy may use a valid certificate for the remote network, to which a man-in-the-middle device may not have access. The proxy may query and access policies (e.g., policies for respective remote network resources), which may be provided and modified by users of the virtual networks. The remote network may discard an API call which violates a policy.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for identity-aware filtering with a proxy for virtual networks, in accordance with one or more example embodiments of the present disclosure.

Referring to FIG. 1, the process 100 may include a device 102, which may access one or more remote network resources 104 provided by a virtual network 105 (e.g., a virtual network dedicated to the device 102). The device 102 may use an interface (e.g., a software tool kit, a command line interface, a web browser, a mobile application, or another application) whose API is provided by the one or more remote network resources 104 and allows the device 102 to integrate with and access the one or more remote network resources 104. The device 102 may, at step 106, make an API call for a service of the one or more remote network resources 104. The API call may be encrypted (e.g., using TLS protocol). Proxies 108 may determine whether the account or tenant which sent an API call is authorized to operate using the virtual network (e.g., to access the one or more remote network resources 104). For example, the proxies 108 may include individual proxies for respective services associated with the one or more remote network resources 104 (e.g., a proxy of the proxies 108 may connect the device 102 to a single remote network service). At block 112, depending on the service requested by the API call, a proxy of the proxies 108 may terminate the encryption (e.g., TLS encryption) of the API call by using a man-in-the-middle attack and an invalid certificate to identify the account (e.g., a user and the user's associated accounts) for which the API call was made (e.g., identify the signer of the API call). At block 114, the proxy of the proxies 108 may determine the account or tenant for which the API call was made and whether the account is authorized to operate using the virtual network 105 (e.g., to access the one or more remote network resources 104). The proxy may use one or more invalid private certificates to determine whether the account is authorized to operate using the virtual network 105 (e.g., because the proxy may not have access to a valid certificate of the virtual network 105). The device 102 may make an API call with the account or tenant which has access to the one or more remote network resources 104, but not using the virtual network 105 monitored by the proxies 108. Without cracking the security of the API call at block 112, the proxy of the proxies 108 may recognize that the account is for resources of the one or more remote network resources 104, but not whether the account is authorized to access resources using the virtual network 105 monitored by the proxy.

Still referring to FIG. 1, at block 116, the proxy of the proxies 108 may send the API call to the one or more remote network resources 104 when the proxy determines that the account associated with making the API call is authorized to operate using the virtual network to access the service of the one or more remote network resources 104. At step 118, the proxy of the proxies 108 may receive return data from the one or more remote network resources 104 using a communication channel created by a valid private certificate (e.g., because the proxy reconnects to the API endpoint at step 116 using valid encryption). The return data may include a status code (e.g., 200 for success, 401 for an authorization error, 403 for a forbidden error, etc.). When the proxy of the proxies 108 determines that the account is not authorized to operate using the virtual network to access a resource requested in an API call, the proxy may respond to the device 102 with a 401 error or 403 error. The return data may include data responding to the action indicated in the API call (e.g., get data, post data, put data, delete data, etc.). The proxy of the proxies 108, at step 120, may send the return data to the device 102 using a communication channel created by an invalid certificate (e.g., the proxy connects to a remote endpoint of the one or more remote network resources 104 using a valid/legitimate certificate, but communicates with an interface of the device 102 using a fake/invalid certificate). This approach requires terminating the security of the API call and using multiple proxies 108 to service multiple remote network services/resources.

To avoid using multiple proxies 108 and having to terminate the security of an encrypted API call, the process 100 may add an endpoint proxy 128, which may be included in the virtual network 105 used by the device 102 to access the one or more remote network resources 104. For example, the one or more remote network resources 104 may be accessed by multiple accounts, and any account may have a dedicated virtual network for the device 102 to access the one or more remote network resources 104. The endpoint 128 may monitor API calls for multiple services without the need to terminate the encryption of the API calls using a man-in-the-middle and an invalid certificate. For example, at step 130, the device 102 may make an API call to the one or more remote network resources 104. The API call may be signed using an access key identifier, and may also use a secret key in the signature process. At block 132, the endpoint 128 may receive the API call (e.g., because the endpoint 128 has been mapped to the device 102 as an endpoint for the one or more remote network resources 104), may identify the signer of the API call based on the access key identifier (e.g., a credential), and may determine whether the account or tenant associated with the signer API call is authorized to use the virtual network 105. The endpoint 128 may avoid terminating TLS encryption of the API call before reaching the endpoint 128, may identify the access key identifier included in the signed API call, and may determine whether the access key identifier corresponds to a signer and the account or tenant which has been approved to use the virtual network 105 monitored by the endpoint 128. If the account is not authorized to access a remote network resource using the virtual network 105 monitored by the endpoint 128, the endpoint 128 may send an error notification to the device 102, even if the account is authorized to access resources of the one or more remote network resources 104 using another virtual network (e.g., if the account is a personal account of an employee whose employer has authorized business accounts to access resources, but has not authorized personal accounts which may access remote network resources). Approval to use the virtual network 105 may be based on a predetermined policy available to the endpoint 128.

Still referring to FIG. 1, at block 134, the endpoint 128 may send the API call to the one or more remote network resources 104 when the proxy 128 determines that the account associated with making the API call is authorized to operate using the virtual network to access the service of the one or more remote network resources 104. At block 136, the proxy 128 may receive return data from the one or more remote network resources 104 using a communication channel created by a valid public certificate. The return data may include a status code (e.g., 200 for success, 401 for an authorization error, 403 for a forbidden error, etc.). The return data may include data responding to the action indicated in the API call (e.g., get data, post data, put data, delete data, etc.). The proxy 128, at step 138, may send the return data to the device 102 using a communication channel created by the valid public certificate. This enhanced approach uses identity-aware proxy filtering which does not require cracking the security of the API call and does not require using the multiple proxies 108 to service multiple remote network services/resources.

Figure 2:
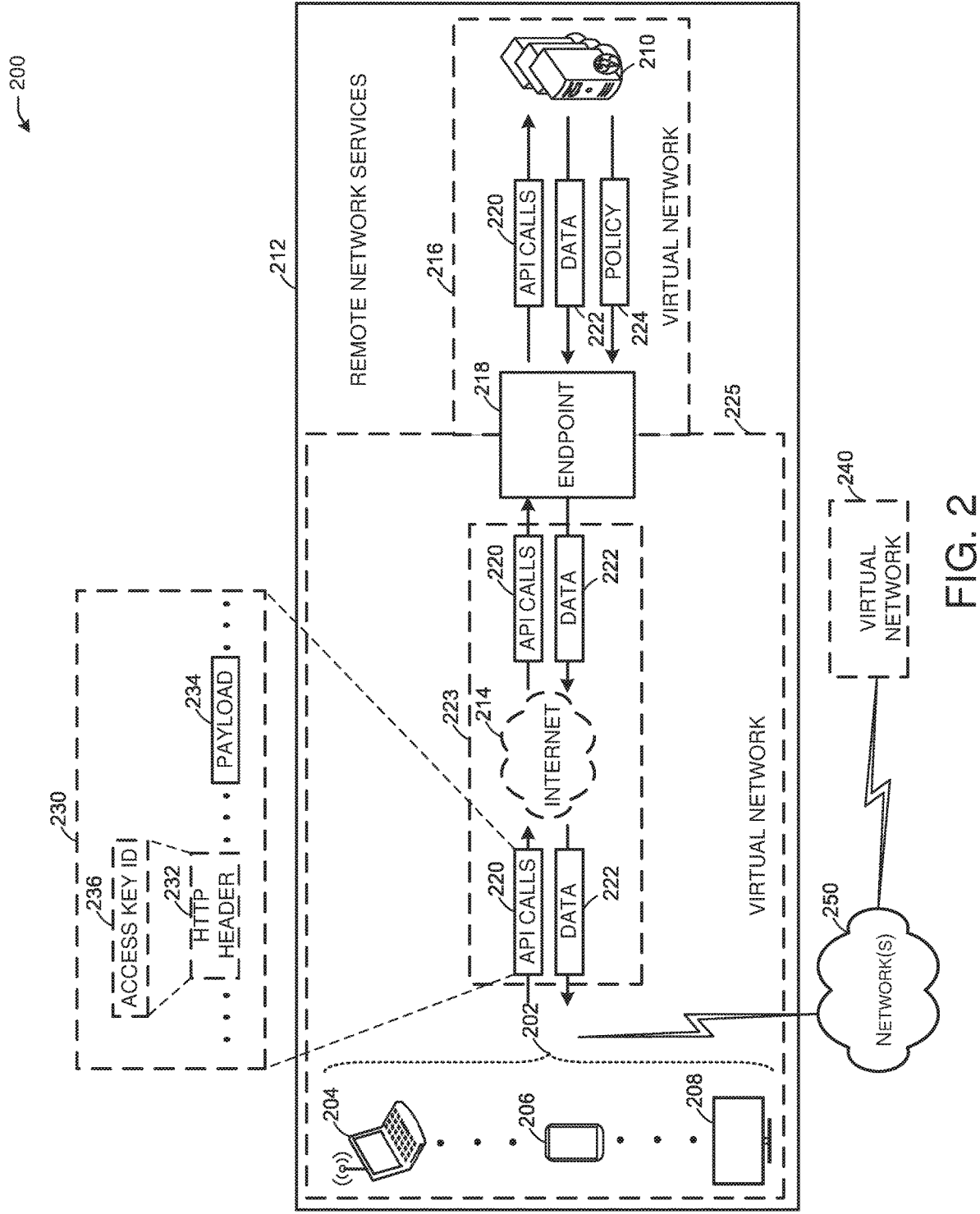
FIG. 2 illustrates a system for identity-aware filtering with a proxy for virtual networks, in accordance with one or more example embodiments of the present disclosure.

In one or more embodiments, the proxy 128 may be established within a virtual network (e.g., as shown in FIG. 2) which allows devices (e.g., device 102) to access remote network resources (e.g., the one or more remote network resources 104) using respective APIs of the remote network resources. The proxy 128 may facilitate connections between devices (e.g., device 102) using the virtual network and any remote network resources.

In one or more embodiments, the proxy may evaluate transmissions such as API calls made by devices using a virtual network to access resources of remote network services. The proxy's evaluation may avoid cracking the TLS encryption. When the API calls for the remote network resources are authenticated and authorized by a signature process which includes adding an access key identifier and secret access key, the proxy may examine received API calls and identify the access key identifier (e.g., within a header of an API call). If the API call is not signed, the proxy may evaluate the data payload of an API call to determine the associated user account of the API call. The proxy may find a matching account number and/or organization identifier for a given access key identifier. If the proxy does not find a matching account number, the proxy may discard the API call and prevent the API call from reaching the remote network resource. When the proxy identifies an access key identifier in an API call, the proxy may compare the access key identifier to one or more policies associated with a remote network resource. The proxy may query the virtual network for a respective policy, and may store the policy so that the proxy may evaluate API calls without always having to query the virtual network. The proxy may receive updates to the policy based on user requests, may receive an updated policy from a respective remote network resource, and/or may modify an existing policy based on a number of times an API has been called, a number of times unauthorized user accounts have called the API, historical trends in use of the virtual network, and machine learning techniques.

In one or more embodiments, the proxy 128 may use lists indicating whether accounts are authorized to operate using the virtual network to access remote network resources or have been blacklisted from using the virtual network. A policy may be specific to a particular remote network service. The proxy 128 may determine that an access key identifier corresponds to the account or tenant, and may determine if the account is authorized by a policy to use the virtual network 105.

In one or more embodiments, the proxy 128 may prevent unwanted data exfiltration between the one or more remote network resources 104. For example, the proxy 128 may prevent the account or tenant with access to resources of a remote network from accessing the one or more remote network resources 104.

FIG. 2 illustrates a system 200 for identity-aware filtering with a proxy for virtual networks, in accordance with one or more example embodiments of the present disclosure.

Referring to FIG. 2, the system 200 may include one or more user devices 202 (e.g., user device 204, user device 206, user device 208), which may access one or more remote network resources 210 provided by remote network services 212. To access the one or more remote network resources 210, the one or more user devices 202 and/or a virtual network 240 (e.g., which also may make the API calls 220) may connect to the Internet 214 to access a virtual network 216, which may be a dedicated private network for the one or more user devices 202 and/or the virtual network 240 with access to the one or more remote network resources 210, and whose access to the one or more remote network resources 210 may be governed by one or more policies. To implement the policies and prevent unauthorized use of the virtual network 216, the virtual network 216 may include an endpoint 218 which may serve as an endpoint for the one or more user devices 202 and/or the virtual network 240 when calling the APIs of the one or more remote network resources 210 using the virtual network 216 (e.g., the endpoint 218 may be an endpoint for multiple resources whose access is provided by the virtual network 216). The API calls 220, the data 222, and the Internet 214 may form a tunnel 223 (e.g., a TLS or other encryption tunnel), into which a man-in-the-middle (e.g., proxies 108 of FIG. 1) may need to break in order to inspect the API calls 220 before the API calls 220 reach the endpoint 218. The entire exchange may occur within a virtual network (e.g., the remote network services 212 or a virtual network 225 within the remote network services 212), in which case the Internet 214 may be avoided. When the communications use a second virtual network within the remote network services 212, such as the virtual network 225, the endpoint 218 may "bridge the gap" between the virtual network 225 and the virtual network 216. The endpoint 218 may receive a respective policy 224 for any remote network resource of the one or more remote network resources 210, and the policy may govern which accounts are authorized to use the virtual network 216.

Still referring to FIG. 2, the one or more user devices 202 may make API calls 220 and receive data 222 from the APIs of the one or more remote network resources 210 using one or more communication networks 250 to access the Internet 214. The endpoint 218 may serve as a gateway or interface for the one or more user devices 202 and the virtual network 216. For example, the endpoint 218 may provide a target in route tables (not shown) for internet-routable traffic, and may perform NAT for instances to which public IP addresses have been assigned. The proxy may facilitate communication between instances of the virtual network 216 and the Internet 214.

In one or more embodiments, the one or more user devices 202 may query an endpoint DNS and route packets such as the API calls 220 to the endpoint 218 as an endpoint. The endpoint 218 may use the policy 224 to inspect the API calls 220 and determine whether the account or tenant for the API calls 220 may be authorized to access a particular resource using the virtual network 216. For example, the API calls 220 may include a packet format 230, which may include one or more fields, such as a http header 232 (e.g., if the API call 220 is signed) and a payload 234. The HTTP header 232 may include an access key identifier 236 used to sign the API call 220. The endpoint 218 may avoid terminating/cracking TLS encryption of the API calls 220 by identifying the access key identifier 236 and identifying a matching account number and/or organization identifier for the remote network services 212. The endpoint 218 may examine the policy 224 for a respective resource associated with an API call and may determine whether the account number or organization identifier is authorized to use the virtual network 216. In this manner, the API calls 220 may remain encrypted until received by the virtual network 216 rather than requiring a device outside of the virtual network 216 to terminate/crack the encryption and use private/invalid security certificates not managed by the virtual network 216.

In one or more embodiments, the endpoint 218 may be a device, system, server, etc., and may be established within the virtual network 216 (e.g., at an edge of the virtual network 216). The endpoint 218 may allow the one or more user devices 202 to access the one or more remote network resources 210 using respective APIs of the one or more remote network resources 210. The endpoint 218 may function similar to a NAT method in which an address is mapped from one address space (e.g., IP) to another by including information in transmitted packets. Rather than terminating/cracking the TLS of a transmission (e.g., the API calls 220) from the one or more user devices 202 using the virtual network 216 to call a remote network resource, the endpoint 218 may function as the outbound endpoint for the DNS zones of the virtual network 216. The endpoint 218 may generate remote network endpoint-specific hostnames for the virtual network 216, and may map the virtual network DNS zone for any service hosted by the remote network services 212 to the endpoint of the endpoint 218. In this manner, a single virtual network endpoint may facilitate connections between the one or more user devices 202 using the virtual network 216 and any (e.g., multiple) resources provided by the remote network services 212.

In one or more embodiments, the evaluation of the API calls 220 by the endpoint 218 may avoid terminating/cracking TLS encryption of the API calls 220. When the API calls 220 for the one or more remote network resources 210 are authenticated and authorized by a signature process which includes the access key identifier 236, the endpoint 218 may examine the API calls 220 and identify the access key identifier 236 (e.g., within the HTTP header 232 of an API call). If an API call is not signed, the endpoint 218 may evaluate the payload 324 of the API call to determine the associated user account of the API call. The endpoint 218 may find a matching account number and/or organization identifier for a given access key identifier 236. If the endpoint 218 does not find a matching account number, the endpoint 218 may discard the API call and prevent the API call from reaching the one or more remote network resources 210. When the endpoint 218 identifies the access key identifier 236 in an API call, the endpoint 218 may compare the access key identifier 236 to the policy 224 associated with a remote network resource. The endpoint 218 may query the virtual network 216 for a respective policy, and may store the policy 224 so that the endpoint 218 may evaluate API calls without always having to query the virtual network 216. The endpoint 218 may receive updates to the policy 224 based on user requests, may receive an updated policy from the virtual network 216, and/or may modify an existing policy based on a number of times an API has been called, a number of times unauthorized user accounts have called the API, historical trends in use of the virtual network, and machine learning techniques which may result in automatic modification of a policy without direct user requests.

In one or more embodiments, the endpoint 218 may use lists indicating whether accounts are authorized to use the virtual network 216 (e.g., to access the one or more remote network resources 210). The policy 224 may be specific to a particular remote network service. The endpoint 218 may determine that the access key identifier 236 corresponds to the account or tenant, and may determine if the account is authorized by the policy 224 to operate the virtual network 216. When the account or tenant is authorized to operate using the virtual network 216, the endpoint 218 may send the API call to the respective remote network resource, may receive data 222 in response, and may provide the data 222 to the requesting user device over a communication channel created by the user device using the valid public certificate (e.g., a remote network encryption certificate). When the account or tenant is not authorized to use the virtual network 216 (e.g., is listed as an unauthorized account or is not listed as an authorized account), the endpoint 218 may prevent the API call from being sent to the respective remote network resource, may send an error to the requesting user device, and/or may report the denial to the virtual network 216 and/or another device or account (e.g., a management account for the virtual network 216).

In one or more embodiments, the endpoint 218 may serve as an outbound proxy for traffic destined outside of the remote network services 212 (e.g., Internet traffic not associated with using the one or more remote network resources 210). A virtual network user may select whether to allow the endpoint 218 to filter the API calls 220 or other traffic between the virtual network 216 and a resource outside of a remote network.

In one or more embodiments, the endpoint 218 may prevent unwanted data exfiltration between the one or more remote network resources 210 provided by the remote network services 212. For example, the endpoint 218 may prevent the account or tenant with access to resources of the remote network services 212 from accessing the one or more remote network resources 210 (e.g., resources using the same remote network services 212) of another account using the virtual network 216.

In one or more embodiments, the virtual network 216 may serve as a networking layer for elastic computing capacity in a network including the remote network services 212. The remote network services 212 may be launched using virtual servers (e.g., servers providing the one or more remote network resources 210). The virtual network 216 may provide virtual computing environments (e.g., instances), environment templates, computing and memory configurations, login information, physical locations for the one or more remote network resources 210, firewalls, IP addresses, and other elastic computing resources available to the one or more user devices 202.

In one or more embodiments, the one or more user devices 202 may include a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

The one or more user devices 202 may be configured to communicate via the communications network 250, wirelessly or wired. The communications network 250 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 250 may have any suitable communication range associated therewith and may include, for example, global networks (e.g., the Internet), metropolitan area networks (MANs), wide area networks (WANs), local area networks (LANs), or personal area networks (PANs). In addition, the communications network 250 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The one or more user devices 202 and/or the endpoint 218 may include one or more communications antennas. The one or more communications antennas may be any suitable type of antennas corresponding to the communications protocols used by the one or more user devices 202 and/or the endpoint 218. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the one or more user devices 202 and/or the endpoint 218.

The one or more user devices 202 and/or the endpoint 218 may include any suitable radio and/or transceiver for transmitting and/or receiving radio frequency (RF) signals in the bandwidth and/or channels corresponding to the communications protocols utilized by any of the one or more user devices 202 and/or the endpoint 218 to communicate with each other. The radio components may include hardware and/or software to modulate and/or demodulate communications signals according to pre-established transmission protocols. The radio components may further have hardware and/or software instructions to communicate via one or more cellular protocols, Wi-Fi and/or Wi-Fi direct protocols, as standardized by the Institute of Electrical and Electronics Engineers (IEEE) 802.11 standards, or other communication protocols.

Figure 3:
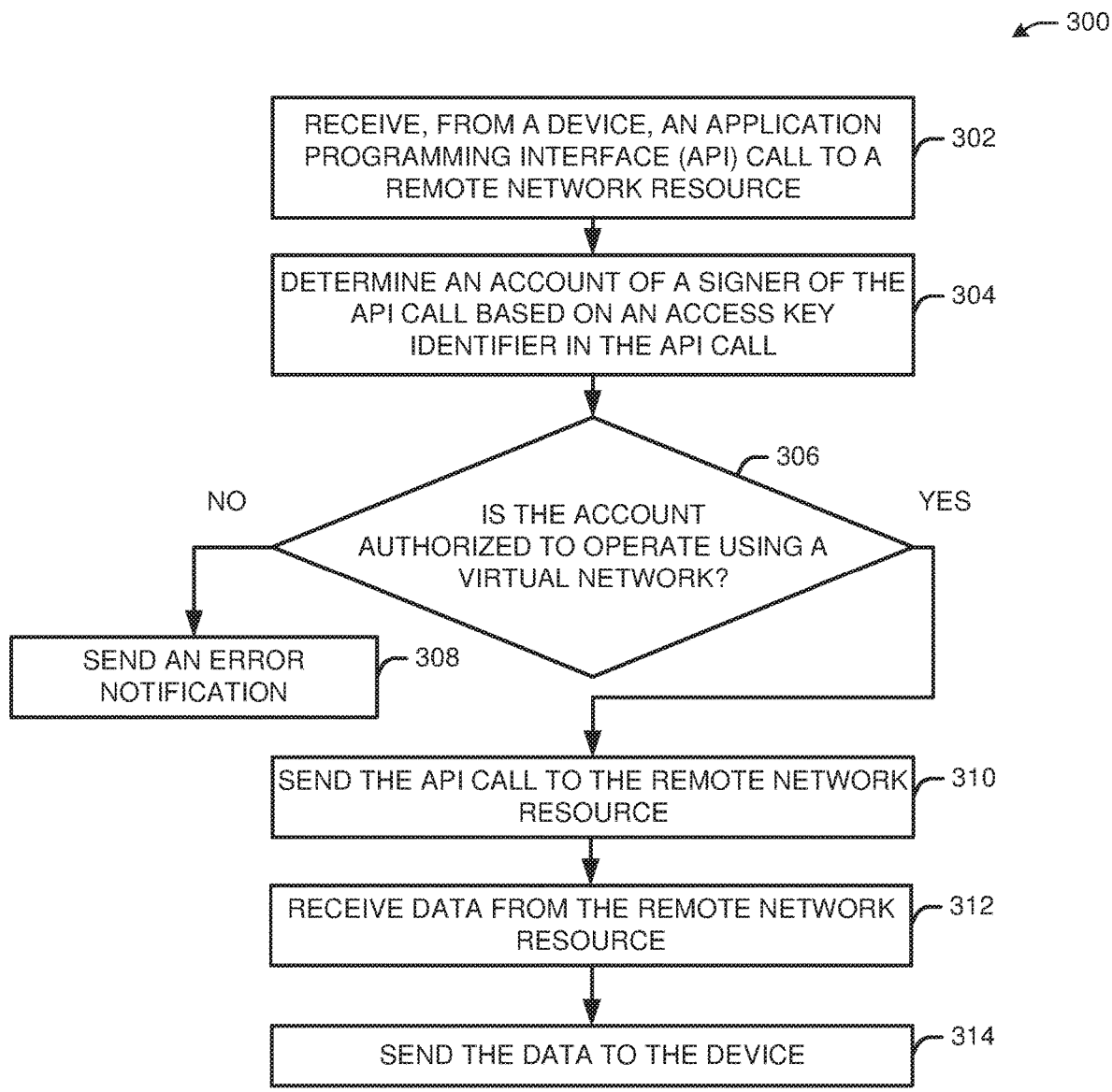
FIG. 3 illustrates a flow diagram for a process for identity-aware filtering with a proxy for virtual networks, in accordance with one or more example embodiments of the present disclosure.

FIG. 3 illustrates a flow diagram for a process 300 for identity-aware filtering with a proxy for virtual networks, in accordance with one or more example embodiments of the present disclosure.

At block 302, a first device (e.g., the endpoint 218 of FIG. 2) may receive, from a second device (e.g., the one or more user devices 202 of FIG. 2) an API call (e.g., the API calls 220 of FIG. 2) to a remote network resource (e.g., the one or more remote network resources 210 of FIG. 2). The API call may be secured, for example, by using TLS protocol encryption (e.g., a TLS protocol API call). The API call may include an access key identifier (e.g., the access key identifier 236 of FIG. 2) in a header (e.g., the HTTP header 232 of FIG. 2 if the API call is signed) or in a payload (e.g., the payload 234 of FIG. 2 if the API call is unsigned. The API call may be made by the second device using a virtual network (e.g., the virtual network 216 of FIG. 2) dedicated to one or more accounts. The virtual network may provide access to remote network resources provided by remote network services (e.g., the remote network services 212 of FIG. 2).

At block 304, the first device may determine the account of a signer for the API call by mapping the credential (e.g., the access key identifier 236 of FIG. 2) to a signer, and identifying any accounts the signer may have for a remote network. The remote network resources may be available to accounts established for the remote network services, and the virtual network may allow some accounts to access some remote network resources (e.g., remote network resources to which an enterprise or other organization has subscribed). The virtual network may allow some accounts to access some remote network resources, but may restrict some accounts from accessing some remote network resources. For example, organizational accounts may be authorized to operate using the virtual network to access some remote network resources, but an organization may want to prevent a user's personal account with the remote network services from accessing the user's personal remote network resources using the virtual network (e.g., prevent a user from downloading enterprise data to a personal account with the remote network services). Even when the API call is encrypted or otherwise secured, the first device may identify the account associated with the signer of the API call without having to terminate the encryption and undermine the security of the transmission of the API call (e.g., the first device may use a valid remote network encryption certificate and may serve as the endpoint for the API call rather than as a man-in-the-middle device which may use an invalid private certificate to inspect the API call). The first device may map the access key identifier to a user (e.g., using a mapping table or other logic matching identifiers to accounts), and may identify any accounts of the user. The account information may be stored on the first device or provided to the first device upon demand.

At block 306, the first device may determine whether the account is authorized to operate using a virtual network (e.g., the virtual network 216 of FIG. 2). Any remote network resource may use a policy which defines which accounts are allowed to access a remote network resource using the virtual network, or which accounts may be prohibited from allowing access to a remote network resource using the virtual network (e.g., an account may have access to the remote network, but not using the virtual network). The first device may query the virtual network for a policy upon receiving an API call or other transmission intended for the respective remote network resource, may store the policy and examine the policy for authorization of the account or tenant when an API call or other transmission is received, and may update the policy based on requests and/or analysis of user actions, the number of blocked or allowed API calls, machine learning algorithms, or other methods. When the account is not authorized to operate using the virtual network to access the remote network resource to which the API call was made, the process 300 may continue at block 308. When the account is authorized to operate using the virtual network to access the remote network resource to which the API call was made, the process 300 may continue at block 310.

At block 308, the first device may send a notification error indicating that the account is not authorized to operate using the virtual network to access the remote network resource to which the API call was made. The first device may send an error notification to the second device and/or to any other device. For example, the first device may send 401 or 403 errors to the first device, and/or may report the attempted unauthorized access of remote network resources to a device (e.g., the one or more user devices 202 of FIG. 2). The first device may maintain an error log indicating the attempts to access a remote network resource which were unauthorized. The first device may discard unauthorized API calls, or may send the unauthorized API calls to the remote network resource and log the allowed unauthorized access of a remote network resource on the basis of an API call or another transmission. An account or tenant may be authorized to operate using the virtual network to access a remote network resource when it is on an allowed list, not on a prohibited list, when the number of unauthorized API calls is below a threshold, when the security implications (e.g., an assessed "blast radius" of the resources impacted by the API call) meet or do not meet certain criteria (e.g., the remote network resource has a security risk below a threshold risk based on the type of information associated with the remote network resource, an assigned security level, etc.), or other considerations specified by a user or determined automatically by the first device or another device associated with the virtual network.

At block 310, the first device may send the API call or a representation of the API call to the remote network resource for which the API call was intended. The first device may log the API calls which were sent to remote network resources and may track the number of allowed and blocked API calls. The first device may determine, based on information in the API call, the remote network resource whose API has been called, and may forward the API call to the remote network resource.

At block 312, the first device may receive data from the remote network resource using a communication channel created by using the valid remote network encryption certificate. The data may be received in response to the API call. For example, the API call may indicate an action such as "get," "post," "put," "delete," or another action, and the response may include a status code (e.g., success, failure, prohibited access, etc.), a content type, data requested by the API call, data confirming posted information, data confirming a deletion or modification, or other data. At block 314, the first device may send the data received from the remote network resource in response to the API call to the second device using a communication channel created by using the valid remote network encryption certificate.

Figure 4:
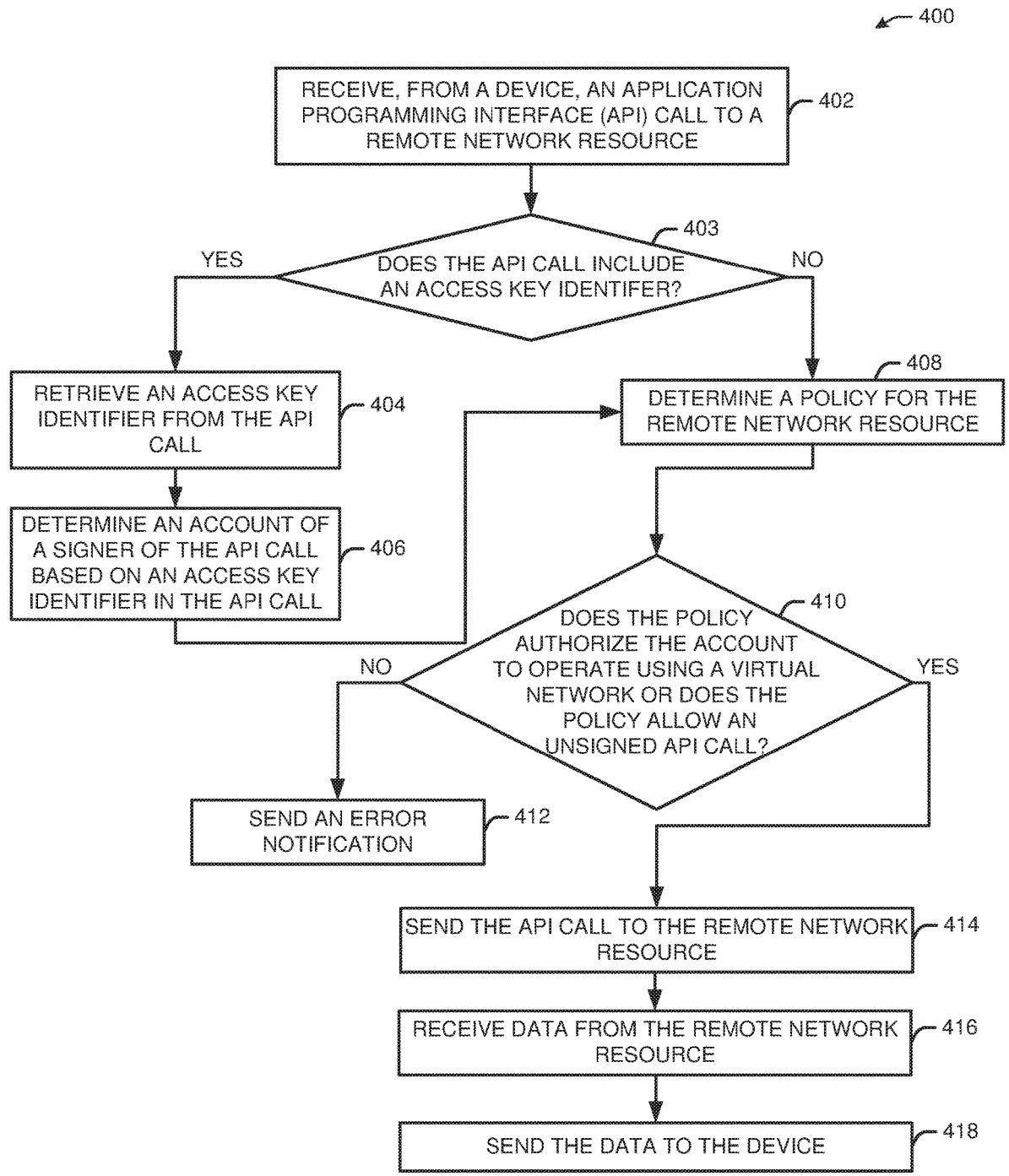
FIG. 4 illustrates a flow diagram for a process for identity-aware filtering with a proxy for virtual networks, in accordance with one or more example embodiments of the present disclosure.

FIG. 4 illustrates a flow diagram for a process 400 for identity-aware filtering with a proxy for virtual networks, in accordance with one or more example embodiments of the present disclosure.

At block 402, a first device (e.g., the endpoint 218 of FIG. 2) may receive, from a second device (e.g., the one or more user devices 202 of FIG. 2) an API call (e.g., the API calls 220 of FIG. 2) to a remote network resource (e.g., the one or more remote network resources 210 of FIG. 2). The API call may be secured, for example, by using TLS protocol encryption (e.g., a TLS protocol API call). The API call may be made by the second device using a virtual network (e.g., the virtual network 216 of FIG. 2) dedicated to one or more accounts. The virtual network may provide access to remote network resources provided by remote network services (e.g., the remote network services 212 of FIG. 2).

At block 403, the first device may determine whether the API call includes a credential such as an access key identifier (e.g., the access key identifier 236 of FIG. 2). The first device may serve as the endpoint of the API call and may use a valid remote network encryption certificate to inspect the API call. When the first device identifies a credential in the API call, the process 400 may continue at block 404. When the first device does not identify a credential in the API call, the process 400 may continue at block 410.

At block 404, the first device may retrieve an identifier (e.g., a credential) such as an access key identifier included in an API call. Even when the API call is encrypted or otherwise secured, the first device may identify the account or tenant associated with the API call without having to terminate the encryption and undermine the security of the transmission of the API call because the first device may be associated with the remote network which may provide the remote network resource called by the API call and may use a valid remote network resource certificate (e.g., the first device may be the endpoint of the API call rather than a man-in-the-middle). The API call may include an access key identifier (e.g., the access key identifier 236 of FIG. 2) in a header (e.g., the http header 232 of FIG. 2 if the API call is signed) or in a payload (e.g., the payload 234 of FIG. 2) if the API call is unsigned. The API call may be made by the second device using a virtual network (e.g., the virtual network 216 of FIG. 2) dedicated to one or more accounts. The access key identifier may have been established by the virtual network (or a remote network including the virtual network).

At block 406, the first device may determine, based on the access key identifier, an account of the signer of the API call. The first device may map the access key identifier to a signer, and may identify any accounts (e.g., using a mapping table or other logic matching identifiers to accounts) of the signer. The account information may be stored on the first device or provided to the first device upon demand. The remote network resources may be available to accounts established for the remote network services, and the virtual network may allow some accounts to access some remote network resources (e.g., remote network resources to which an enterprise or other organization has subscribed). The virtual network may allow some accounts to access some remote network resources, but may restrict some accounts from accessing some remote network resources. For example, organizational accounts may be authorized to operate using the virtual network to access some remote network resources, but an organization may want to prevent a user's personal account with the remote network services from accessing the organization's remote network resources using the virtual network (e.g., prevent a user from downloading enterprise data to a personal account with the remote network services). To determine the account, the first device may identify an identifier such as an access key identifier included in an API call. Even when the API call is encrypted or otherwise secured, the first device may identify the account or tenant associated with the API call without having to crack the encryption and undermine the security of the transmission of the API call. The first device may map the access key identifier to the account or tenant (e.g., using a mapping table or other logic matching identifiers to accounts). The account information may be stored on the first device or provided to the first device upon demand.

At block 408, the first device may determine a policy for the remote network resource which provides the API associated with the API call. Any remote network resource may use a policy which defines which accounts are allowed to use a virtual network. The first device may query the virtual network for a policy upon receiving an API call or other transmission intended for the respective remote network resource, may store the policy and examine the policy for authorization of the account or tenant when an API call or other transmission is received, and may update the policy based on requests and/or analysis of user actions, the number of blocked or allowed API calls, machine learning algorithms, or other methods.

When the first device identifies a credential at block 403, the first device may determine whether the policy allows or the account of the signer of the API call to use a virtual network at block 410, or whether the policy allows an unsigned API call to be made at block 410. An account or tenant may be authorized to use a virtual network when the account is on an allowed list, not on a prohibited list, when the number of unauthorized API calls is below a threshold, when the security implications (e.g., an assessed "blast radius" of the resources impacted by the API call) meet or do not meet certain criteria (e.g., the remote network resource has a security risk below a threshold risk based on the type of information associated with the remote network resource, an assigned security level, etc.), or other considerations specified by a user or determined automatically by the first device or another device associated with the virtual network. An unsigned API call may be allowed based on a set policy and/or based on a determination of the first device that the type of API call (e.g., get, put, etc.) may be allowed when unsigned or not allowed when unsigned. When the account is not authorized to use a virtual network, the process 400 may continue at block 412. When the account is authorized to use a virtual network, the process 400 may continue at block 414.

At block 412, the first device may send a notification error indicating that the account is not authorized to operate using the virtual network to access the remote network resource to which the API call was made. The first device may send an error notification to the second device and/or to any other device. For example, the first device may send 401 or 403 errors to the first device, and/or may report the attempted unauthorized access of remote network resources to a device (e.g., the one or more user devices 202 of FIG. 2). The first device may maintain an error log indicating the attempts to access a remote network resource which were unauthorized. The first device may discard unauthorized API calls, or may send the unauthorized API calls to the remote network resource and log the allowed unauthorized access of a remote network resource on the basis of an API call or another transmission.

At block 414, the first device may send the API call or a representation of the API call to the remote network resource for which the API call was intended. The first device may log the API calls which were sent to remote network resources and may track the number of allowed and blocked API calls. The first device may determine, based on information in the API call, the remote network resource whose API has been called, and may forward the API call to the remote network resource.

At block 416, the first device may receive data from the remote network resource using a communication channel created by using a valid remote network encryption certificate. The data may be received in response to the API call. For example, the API call may indicate an action such as "get," "post," "put," "delete," or another action, and the response may include a status code (e.g., success, failure, prohibited access, etc.), a content type, data requested by the API call, data confirming posted information, data confirming a deletion or modification, or other data. At block 418, the first device may send the data received from the remote network resource in response to the API call to the second device using a communication channel created by using a valid remote network encryption certificate.

Figure 5:
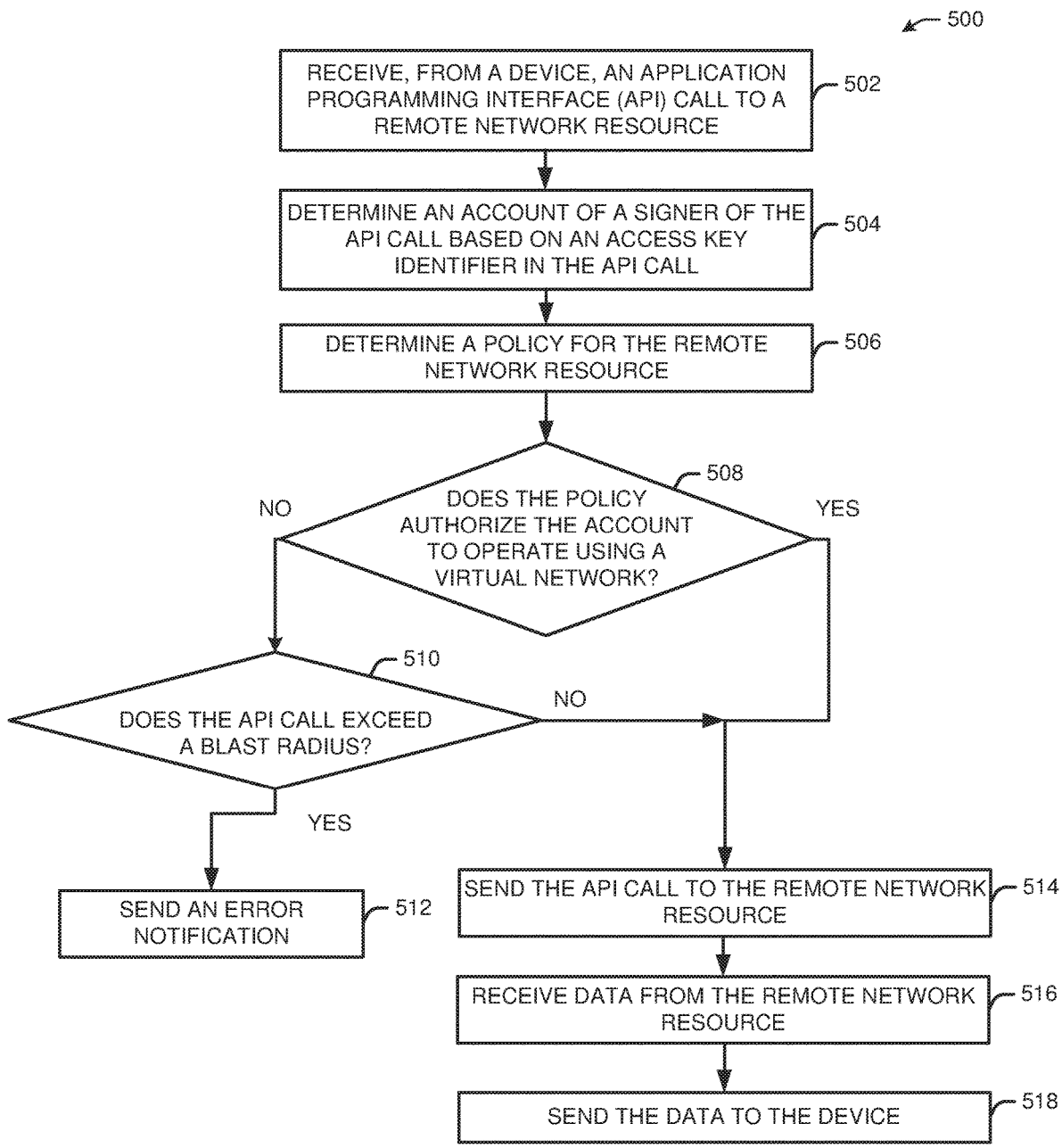
FIG. 5 illustrates a flow diagram for a process for identity-aware filtering with a proxy for virtual networks, in accordance with one or more example embodiments of the present disclosure.

FIG. 5 illustrates a flow diagram for a process 500 for identity-aware filtering with a proxy for virtual networks, in accordance with one or more example embodiments of the present disclosure.

At block 502, a first device (e.g., the endpoint 218 of FIG. 2) may receive, from a second device (e.g., the one or more user devices 202 of FIG. 2) an API call (e.g., the API calls 220 of FIG. 2) to a remote network resource (e.g., the one or more remote network resources 210 of FIG. 2). The API call may be secured, for example, by using TLS protocol encryption (e.g., a TLS protocol API call). The API call may be made by the second device using a virtual network (e.g., the virtual network 216 of FIG. 2) dedicated to one or more accounts. The virtual network may provide access to remote network resources provided by remote network services (e.g., the remote network services 212 of FIG. 2).

At block 504, the first device may determine the account of the signer of the API call. The first device may identify a credential such as an access key identifier (e.g., the access key identifier 236 of FIG. 2), may determine the signer of the API call by mapping the credential to a user, and may identify any accounts of the user. A virtual network (e.g., the virtual network 216 of FIG. 2) may be available to accounts established for the remote network services, and the virtual network may allow some accounts to access some remote network resources (e.g., remote network resources to which an enterprise or other organization has subscribed). The virtual network may allow some accounts to access some remote network resources, but may restrict some accounts from accessing some remote network resources. For example, organizational accounts may be authorized to operate using the virtual network to access some remote network resources, but an organization may want to prevent a user's personal account with the remote network services from accessing the organization's remote network resources using the virtual network (e.g., prevent a user from downloading enterprise data to a personal account with the remote network services). To determine the account, the first device may identify an identifier such as an access key identifier included in an API call. Even when the API call is encrypted or otherwise secured, the first device may identify the account or tenant associated with the API call without having to crack the encryption and undermine the security of the transmission of the API call. The first device may map the access key identifier to the account or tenant (e.g., using a mapping table or other logic matching identifiers to accounts). The account information may be stored on the first device or provided to the first device upon demand.

At block 506, the first device may determine a policy for the remote network resource which provides the API associated with the API call. Any remote network resource may use a policy which defines which accounts are allowed to use a virtual network (e.g., to access a remote network resource). The first device may query the virtual network for a policy upon receiving an API call or other transmission intended for the respective remote network resource, may store the policy and examine the policy for authorization of the account or tenant when an API call or other transmission is received, and may update the policy based on requests and/or analysis of user actions, the number of blocked or allowed API calls, machine learning algorithms, or other methods.

At block 508, the first device may determine if the policy authorizes the account to access the remote network resource using the API call and the virtual network. An account or tenant may be authorized to operate using the virtual network to access a remote network resource when it is on an allowed list, not on a prohibited list, when the number of unauthorized API calls is below a threshold, when the security implications (e.g., an assessed "blast radius" of the resources impacted by the API call) meet or do not meet certain criteria (e.g., the remote network resource has a security risk below a threshold risk based on the type of information associated with the remote network resource, an assigned security level, etc.), or other considerations specified by a user or determined automatically by the first device or another device associated with the virtual network. When the account is not authorized to operate using the virtual network to access the remote network resource to which the API call was made, the process 500 may continue at block 510. When the account is authorized to operate using the virtual network to access the remote network resource to which the API call was made, the process 500 may continue at block 514.

At block 510, the device may determine whether the API call would exceed a blast radius or meet a blast radius condition if the API call were authorized and sent to the remote network resource. The blast radius may represent an indication of the number of remote network services affected by authorizing the API call and performing an action associated with the API call (e.g., data exfiltration, data addition, data deletion, or data manipulation). The blast radius may represent a severity of the action associated with authorizing the API call. For example, the account to which data may be sent in a "get" API call may be a known security risk, the remote network resource may be sensitive in nature (e.g., may have a high security score), and the policy governing access to a remote network resource may specify the types of accounts to which to allow access, the security scores of accounts and resources, the number of services beyond which (e.g., exceeding a threshold) may trigger blocking of the API call. If the API call would exceed a blast radius or satisfy a blast radius condition, the process 500 may continue at block 512. If the API call would not exceed a blast radius or violate a blast radius condition, the process 500 may continue at block 514.

At block 512, the first device may send a notification error indicating that the account is not authorized to operate using the virtual network to access the remote network resource to which the API call was made. The first device may send an error notification to the second device and/or to any other device. For example, the first device may send 401 or 403 errors to the first device, and/or may report the attempted unauthorized access of remote network resources to a device (e.g., the one or more user devices 202 of FIG. 2). The first device may maintain an error log indicating the attempts to access a remote network resource which were unauthorized. The first device may discard unauthorized API calls, or may send the unauthorized API calls to the remote network resource and log the allowed unauthorized access of a remote network resource on the basis of an API call or another transmission.

At block 514, the first device may send the API call or a representation of the API call to the remote network resource for which the API call was intended. The first device may log the API calls which were sent to remote network resources and may track the number of allowed and blocked API calls. The first device may determine, based on information in the API call, the remote network resource whose API has been called, and may forward the API call to the remote network resource.

At block 516, the first device may receive data from the remote network resource using a communication channel created by using a valid remote network resource certificate. The data may be received in response to the API call. For example, the API call may indicate an action such as "get," "post," "put," "delete," or another action, and the response may include a status code (e.g., success, failure, prohibited access, etc.), a content type, data requested by the API call, data confirming posted information, data confirming a deletion or modification, or other data. At block 518, the first device may send the data received from the remote network resource in response to the API call to the second device using a valid remote network resource certificate.

Figure 6:
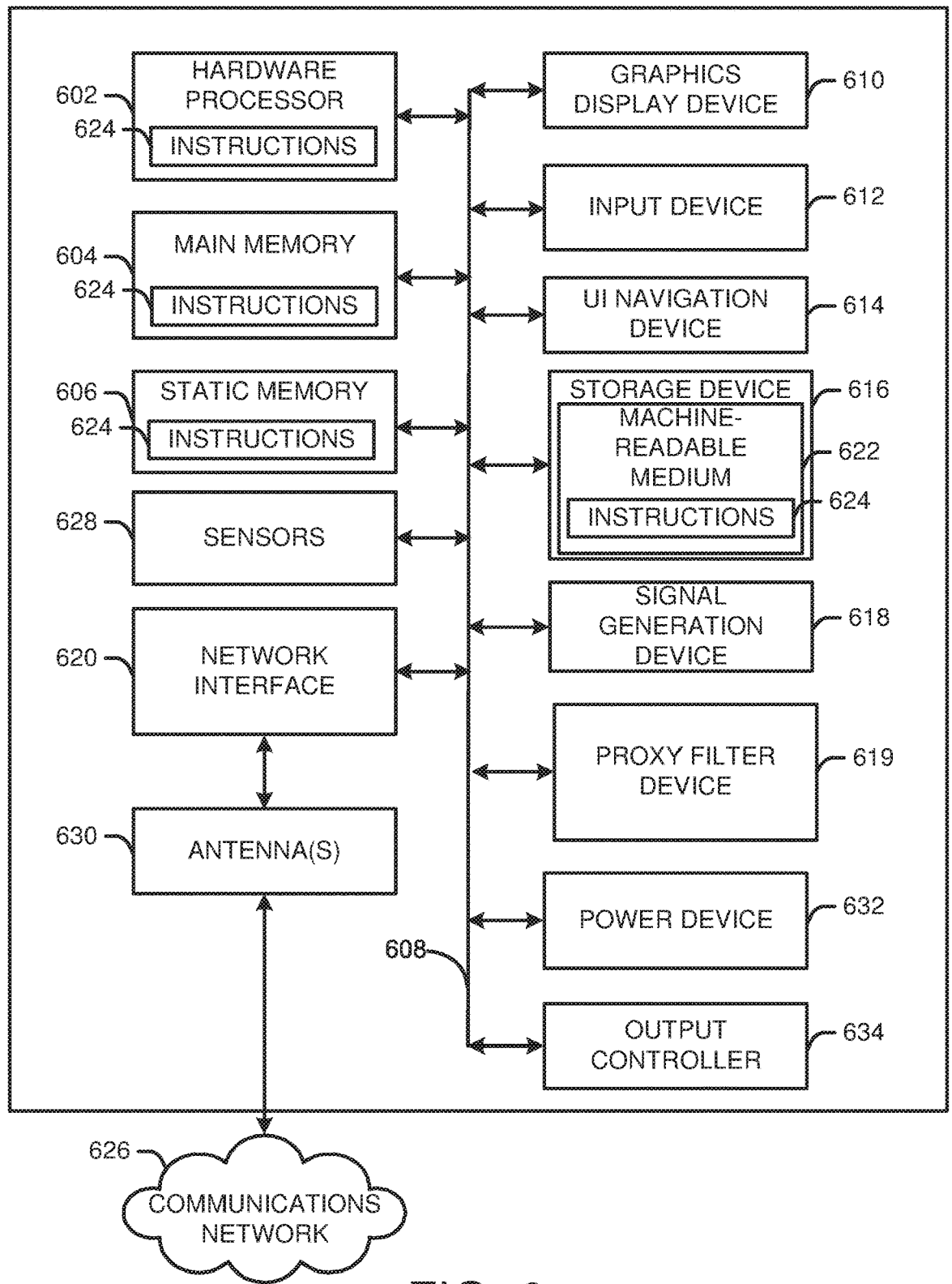
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the proxy 128 of FIG. 1, the endpoint 218 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a server, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., an emitter, a speaker), a proxy filter device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The proxy filter device 619 may carry out or perform any of the operations and processes (e.g., process 300 of FIG. 3, process 400 of FIG. 4, process 500 of FIG. 5) described and shown above.

In one or more embodiments, the proxy filter device 619 may be part of a device which may be established within a virtual network (e.g., the endpoint 218 at an edge of the virtual network 216 of FIG. 2) which allows devices to access remote network resources using respective APIs of the remote network resources. The proxy filter device 619 may serve as a TLS termination point rather than a TLS man-in-the-middle termination point. In particular, rather than terminating and compromising the TLS of a transmission from a device using the virtual network to call a remote network resource, the proxy filter device 619 may function as the outbound endpoint for the domain name system (DNS) zones of a virtual network. The proxy filter device 619 may generate remote network endpoint-specific hostnames for a virtual network, and may map the virtual network DNS zone for any service hosted by a remote network to the endpoint of the proxy filter device 619. In this manner, a single virtual network endpoint may facilitate connections between devices using the virtual network and any (e.g., multiple) services hosted by the remote network.

In one or more embodiments, the proxy filter device 619 may evaluate transmissions such as API calls made by devices using a virtual network to access resources of remote network services. The proxy filter device's 619 evaluation may avoid terminating the TLS encryption before the TLS-encrypted API call reaches an endpoint. When the API calls for the remote network resources are authenticated and authorized by a signature process including an access key identifier, the proxy filter device 619 may examine received API calls and identify the access key identifier or other credential (e.g., within a header of an API call). If the API call is not signed, the proxy filter device 619 may evaluate the data payload of an API call to determine the associated user account of the API call or may determine whether an unsigned API call is allowed to use a virtual network. The proxy filter device 619 may find a matching account number and/or organization identifier for a given access key identifier. If the proxy filter device 619 does not find a matching account number, the proxy filter device 619 may discard the API call and prevent the API call from reaching the remote network resource or may allow the API call if unsigned API calls are permitted by a virtual network. When the proxy filter device 619 identifies an access key identifier in an API call, the proxy filter device 619 may compare the access key identifier to one or more policies associated with a remote network resource. The proxy filter device 619 may query the virtual network for a respective policy, and may store the policy so that the proxy may evaluate API calls without always having to query the virtual network. The proxy filter device 619 may receive updates to the policy based on user requests, may receive an updated policy from a respective remote network resource, and/or may modify an existing policy based on a number of times an API has been called, a number of times unauthorized user accounts have called the API, historical trends in use of the virtual network, and machine learning techniques which may result in automatic modification of a policy without direct user requests.

In one or more embodiments, the proxy filter device 619 may use lists indicating whether accounts are authorized to operate using the virtual network to access remote network resources. A policy may be specific to a particular remote network service. The proxy filter device 619 may determine that an access key identifier corresponds to a signer of the API call, may determine any account of the signer, and may determine if the accounts are authorized by a policy to operate a virtual network. When an account or tenant is authorized to operate using the virtual network to access a remote network resource, the proxy filter device 619 may send the API call to the respective remote network resource, may receive data in response, and may provide the data to the requesting device. When an account or tenant is not authorized to operate using the virtual network to access a remote network resource (e.g., is listed as an unauthorized account or is not listed as an authorized account), the proxy filter device 619 may prevent the API call from being sent to the respective remote network resource, may send an error to the requesting device, and/or may report the denial to the virtual network and/or another device.

In one or more embodiments, the proxy filter device 619 may serve as an outbound proxy for traffic destined outside of a remote network (e.g., Internet traffic not associated with using a computer resource hosted by the remote network). A virtual network user may select whether to allow a proxy to filter API calls or other traffic between a virtual network and a resource outside of a remote network.

In one or more embodiments, the proxy filter device 619 may prevent unwanted data exfiltration between resources hosted by a remote network (e.g., a "me, not me" problem). For example, the proxy filter device 619 may prevent an account or tenant with access to resources of a remote network from accessing the remote network resources (e.g., resources using the same remote network) of another account using the virtual network.

In one or more embodiments, the proxy filter device 619 may use valid private remote network encryption certificates for virtual networks accessing the resources of a remote network. The proxy filter device 619 may query and access the private certificates (e.g., policies for respective remote network resources), which may be provided and modified by users of the virtual networks. The remote network may provide threat detection by monitoring API calls received by the proxy filter device 619 and identifying potentially malicious behavior.

It is understood that the above are only a subset of what the proxy filter device 619 may be configured to perform and that other functions included throughout this disclosure may also be performed by the proxy filter device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:
1. A method, comprising:
  receiving, at a first device in a virtual network, from a second device, a first transport layer security (TLS) protocol application programming interface (API) call comprising a requested remote network resource, wherein the virtual network comprises the requested remote network resource;
retrieving, by the first device, a first access key identifier from the first TLS protocol API call;
determining, by the first device, based on the first access key identifier, a first account associated with the virtual network;
determining, by the first device, based on a policy, that the first account is authorized to access the requested remote network resource using the virtual network;
sending, by the first device, the first TLS protocol API call to the remote network resource, wherein the TLS API call remains encrypted from a time when the first TLS API call is received at the first device through a time when the first device sends the first TLS API call to the requested remote network resource;
receiving, by the first device, based on the first TLS protocol API call, data associated with the requested remote network resource;
sending, by the first device, the data to the second device;
receiving, by the first device, from the second device a second TLS protocol API call to the requested remote network resource;
retrieving, by the first device, a second access key identifier from the second TLS protocol API call;
determining, by the first device, based on the second access key identifier, a second account associated with the virtual network;
determining, by the first device, based on the policy, that the second account is not authorized to access the requested remote network resource using the virtual network; and
sending, by the first device, an error notification to the second device.

2. The method of claim 1, wherein the requested remote network resource is a first requested remote network resource, further comprising:
receiving, from the second device, a third TLS protocol API call comprising a second requested remote network resource, wherein the first requested remote network resource is different from the second requested remote network resource;
determining, based on the third TLS protocol API call, a third access key identifier;
determining, based on the third access key identifier, a third account associated with the second requested remote network resource; and
determining, based on the policy, that the third account is authorized to access the second requested remote network resource using the virtual network.

3. The method of claim 1, wherein the first device is associated with a gateway or an endpoint, wherein the virtual network is associated with a domain name system (DNS) zone, wherein the requested remote network resource is a first requested network resource of two or more remote network resources, and wherein the two or more remote network resources are accessible using the virtual network, further comprising mapping the DNS zone to the gateway or the endpoint, wherein the first TLS protocol API call is received using the mapping.

4. The method of claim 1, wherein the first TLS protocol API call comprises a header and a payload, wherein determining the first access key identifier comprises determining the header, wherein the header comprises the first access key identifier.

5. A method, comprising:
receiving, at a first device in a remote network, an encrypted application programming interface (API) call from a second device, the encrypted API call comprising a requested remote network resource, and wherein the remote network comprises the requested remote network resource;
retrieving, by the first device, a credential from the encrypted API call;
determining, by the first device, based on the credential, an account associated with the remote network;
determining, by the first device, based on a policy of the remote network, that the account is authorized to access the requested remote network resource using the remote network; and
sending, by the first device, based on the determination that the account is authorized to access the remote network resource, the encrypted API call to the requested remote network resource,
wherein the encrypted API call remains encrypted in the remote network from a time when the encrypted API call is received at the first device through a time when the first device sends the encrypted API call to the requested remote network resource.

6. The method of claim 5, further comprising:
receiving, from the second device a second encrypted API call to the requested remote network resource;
retrieving a second credential from the second encrypted API call;
determining, based on the second credential, a second account associated with the remote network;
determining that the second account is not authorized to access the requested remote network resource using the remote network; and
sending an error.

7. The method of claim 5, wherein the encrypted API call comprises a header and a data payload, wherein the header comprises the credential.

8. The method of claim 5, wherein the first device is associated with an endpoint, wherein the requested remote network resource is a first requested remote network resource of two or more remote network resources, wherein the two or more remote network resources are accessible using the remote network and the endpoint.

9. The method of claim 5, wherein determining the authorization comprises:
determining a list of accounts permitted to access the requested remote network resource using the remote network; and
determining that the list of accounts excludes the account, wherein determining that the account is not authorized to access the requested remote network resource using the remote network is based on the list of accounts excluding the account.

10. The method of claim 9, wherein determining the list of accounts comprises:
sending a request for the list of accounts;
receiving the list of accounts; and
storing the list of accounts on the first device.

11. The method of claim 9, wherein the list of accounts is a first list of accounts, further comprising:
determining, based on one or more previously received encrypted API calls, a modification to the first list of accounts; and
determining, based on the modification, a second list of accounts.

12. The method of claim 5, wherein the encrypted API call is a transport layer security (TLS) protocol API call, and wherein determining the account excludes terminating an encryption of the TLS protocol API call by using a first certificate posing as a second certificate which indicates that the first device is an endpoint for the encrypted API call.

13. The method of claim 5, wherein the first device is associated with a gateway or an endpoint, and wherein the encrypted API call comprises an indication of the gateway or an indication of the endpoint.

14. The method of claim 5, wherein the encrypted API call is a first encrypted API call, further comprising:
receiving, at the first device, a second encrypted API call;
determining that the second encrypted API call is unsigned;
determining, based on the policy, that the remote network permits unsigned API calls; and
sending the second encrypted API call.

15. The method of claim 5, wherein the encrypted API call is a first encrypted API call, further comprising:
receiving, at the first device, a second encrypted API call;
determining that the second encrypted API call is unsigned;
determining, based on the policy, that the remote network does not permit unsigned API calls; and
sending an error notification.

16. The method of claim 5, wherein the credential comprises an identifier mapping to a user account or an organization identifier.

17. A device comprising memory coupled to at least one processor, the at least one processor configured to:
receive an encrypted application programming interface (API) call from a second device the encrypted API call comprising a requested remote network resource, wherein the device is included in a remote network, and wherein the remote network comprises the requested remote network resource;
retrieve a credential from the encrypted API call;
determine, based on the credential, an account associated with the requested remote network resource;
determine, based on a policy for the remote network, that the account is authorized to access the requested remote network resource using the remote network; and
send, based on the determination that the account is authorized to access the requested remote network resource, the encrypted API call to the requested remote network resource,
wherein the encrypted API call remains encrypted in the remote network from a time when the device receives the encrypted API call at the device through a time when the device sends the encrypted API call to the requested remote network resource.

18. The device of claim 17, wherein the at least one processor is further configured to:
receive, from the second device a second encrypted API call to the requested remote network resource;
retrieve a second credential from the second encrypted API call;
determine, based on the second credential, a second account associated with the requested remote network;
determine that the second account is not authorized to access the requested remote network resource using the remote network; and
send an error notification.

19. The device of claim 17, wherein the device is associated with a gateway or an endpoint, and wherein the encrypted API call comprises an indication of the gateway or an indication of the endpoint.

20. The device of claim 17, wherein the credential comprises an identifier mapping to a user account or an organization identifier.

* * * * *